United States Patent [19]

Takaragi

[11] Patent Number: 4,953,014
[45] Date of Patent: Aug. 28, 1990

[54] IMAGE PROCESSING APPARATUS COMPENSATING FOR DISTANCE BETWEEN DOCUMENT PORTIONS READ BY RESPECTIVE SENSORS

[75] Inventor: Yoichi Takaragi, Yokohama, Japan

[73] Assignee: Canon Kabushiki Kaisha, Tokyo, Japan

[21] Appl. No.: 255,466

[22] Filed: Oct. 11, 1988

[30] Foreign Application Priority Data

Oct. 23, 1987 [JP] Japan .................. 62-268849

[51] Int. Cl.$^5$ .................. H04N 1/393; H04N 1/46
[52] U.S. Cl. ...................... 358/77; 358/75; 358/451
[58] Field of Search .......... 358/43, 50, 52, 55, 358/75, 78, 80, 77, 287, 451

[56] References Cited

U.S. PATENT DOCUMENTS

| | | | |
|---|---|---|---|
| 4,415,925 | 11/1983 | Tamura | 358/75 |
| 4,553,160 | 11/1985 | Yamamoto et al. | 358/75 |
| 4,558,357 | 12/1985 | Nakagawa et al. | 358/75 |
| 4,587,621 | 5/1986 | DuVall | 358/287 |
| 4,614,977 | 9/1986 | Kawahara et al. | 358/287 |
| 4,691,114 | 9/1987 | Hasegawa et al. | 358/293 |
| 4,716,456 | 12/1987 | Hosaka | 358/75 |
| 4,736,251 | 4/1988 | Sasaoka | 358/75 |
| 4,750,048 | 6/1988 | Satoh et al. | 358/287 |
| 4,809,083 | 2/1989 | Nagano et al. | 358/451 |
| 4,862,285 | 8/1989 | Miyakawa | 358/77 |
| 4,866,512 | 9/1989 | Hirosawa et al. | 358/75 |

FOREIGN PATENT DOCUMENTS 60-123158 7/1985 Japan .................. 358/75

Primary Examiner—James J. Groody
Assistant Examiner—Randall S. Svihla
Attorney, Agent, or Firm—Fitzpatrick, Cella, Harper & Scinto

[57] ABSTRACT

An image processing apparatus having a plurality of parallel linear sensors, which may be sensors for different colors, in which output from one or more of the sensors may be subjected to an interpolation process to produce image data corresponding to the same scan line of an original as the image data being output from another of the sensors. This makes it possible to use the same driving signals for all the sensors even if they are staggered, and yet to produce output image data free of noise of the kind which can be caused by crosstalk. In one embodiment, compensation is made for a distance between two (or more) of the image sensors, based on magnification. In another embodiment, an interpolator is provided and interpolates an image signal of two adjacent lines of image from one image sensor, in accordance with magnification, to obtain an image signal on the same line as that from another of the image sensors.

20 Claims, 9 Drawing Sheets

IMAGE PROCESSING APPARATUS COMPENSATING FOR DISTANCE BETWEEN DOCUMENT PORTIONS READ BY RESPECTIVE SENSORS

BACKGROUND OF THE INVENTION

1. Field of the Invention

The present invention relates to an image processing apparatus, and more particularly to an image processing apparatus which processes image data from a plurality of line sensors arranged parallel.

2. Description of the Related Art

There have been proposed, in several patents assigned in common herewith, a number of kinds of image processing apparatuses which process image data from a plurality of parallel linear sensors.

One, disclosed in U.S. Pat. No. 4,558,357, has three linear sensors each of which has a color filter among red ("R"), green ("G") and blue ("B") filters, and reads a color image. But, that patent does not discuss magnification of image size.

Another, disclosed in U.S. Pat. No. 4,691,114 has a plurality of linear sensors arranged in a staggered manner, and reads an original image and enables one to magnify the image by using delaying memories.

Another, disclosed in U.S. Pat. No. 4,750,048, has three linear sensors arranged parallel to each other and each of which has a color filter selected from among the colors red, green, and blue, wherein those three linear sensors are respectively controlled with driving timing independent of each other in accordance with the magnification.

In a conventional reading apparatus it was required to control the driving timing of each linear sensor in accordance with the magnification in order to obtain data of each color image on the same layout element.

Further, since the conventional apparatus drives each linear sensor with a different transfer clock signal, and the transfer clock signal has a relatively high amplitide, when one clock signal is applied to one sensor while no clock signal is being applied to another sensor, crosstalk is generated in the output of the latter sensor. The crosstalk between linear sensors causes noise signals or image signals, as a result of which the quality of the image signals deteriorates.

SUMMARY OF THE INVENTION

It is an object of the present invention to overcome the above described shortcomings of conventional image processing apparatuses.

It is another object of the present invention to provide an image processing apparatus which enables one to drive a plurality of sensors arranged parallel to each other, with substantially the same timing.

According to one feature of the present invention, an image reading apparatus includes a plurality of linear sensors for reading an original image, which are arranged parallel to each other at a predetermined distance on the original image, a driver for driving the plurality of sensors with substantially the same timing, a memory for storing an image signal from at least one of the image sensors to compensate for the predetermined distance, and output means for outputting a plurality of image signals from the plurality of sensors on substantially the same line of the original image in a predetermined period. Thereby, image signals on the same line can be obtained in a predetermined period without adding a noise signal as a result of crosstalk of the driving signals.

According to another feature of the present invention, an interpolater is provided for interpolating image signals in accordance with the magnification, including equal size magnification, and/or the distance between linear sensors. This makes it possible to obtain image signals for a given line of the image from two of the sensors, even if those two sensors are spaced apart a distance which is not an integral multiple of the pitch between image lines.

The foregoing summary of certain of the more important features of the invention is provided in order that the detailed description of the preferred embodiments thereof that follows may be better understood, and in order that the present contribution to the art may be better appreciated. There are, of course, additional features of the invention that will be described in that detailed description with reference to the accompanying drawings. Those skilled in the art will appreciate that the conception upon which this disclosure is based may readily be utilized as a basis for designing other structures or methods for carrying out the purposes of the invention. It will be understood that the claims are to be regarded as including such other constructions and methods as do not depart from the spirit and scope of the invention.

DETAILED DESCRIPTION OF THE PREFERRED EMBODIMENTS

Figure 1:
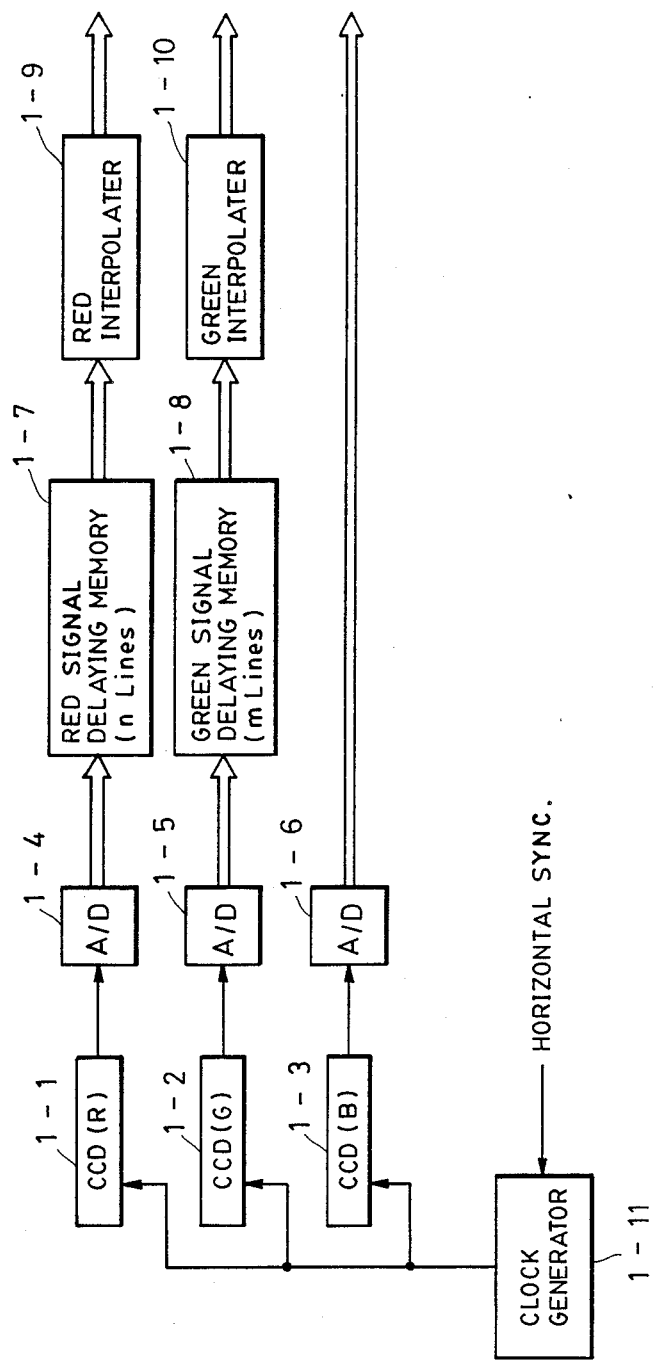
FIG. 1 is a block diagram of a color image reading apparatus according to a first embodiment of the invention.

The image reading apparatus represented in FIG. 1 includes a R (red) linear image sensor 1—1 for reading a red component of an original image, a G (green) linear image sensor for reading a green component of the original image, a B (blue) linear image sensor for reading a blue component of the original image, analog-to-digital converters 1-4, 1-5, 1-6 for respectively converting analog color signals output by sensors to digital color signals, a red delaying memory 1-7 for delaying the red signal from the R sensor 1-1, a green delaying memory 1-8 for delaying the green signal from the G sensor 1-2, a red interpolater 1-9 for interpolating the red signal, and a green interpolater 1-10 for interpolating the green signal. A clock generator 1-11 is also provided for driving sensors 1-1, 1-2, 1-3 with a common clock signal in synchronization with a horizontal synchronizing signal. The generator 1-11 generates a transfer clock for the sensors 1-1, 1-2 and 1-3 which are installed on a same board in synchronization with the horizontal signal from a printer or a microprocesser, shown in FIG. 2.

Figure 2:
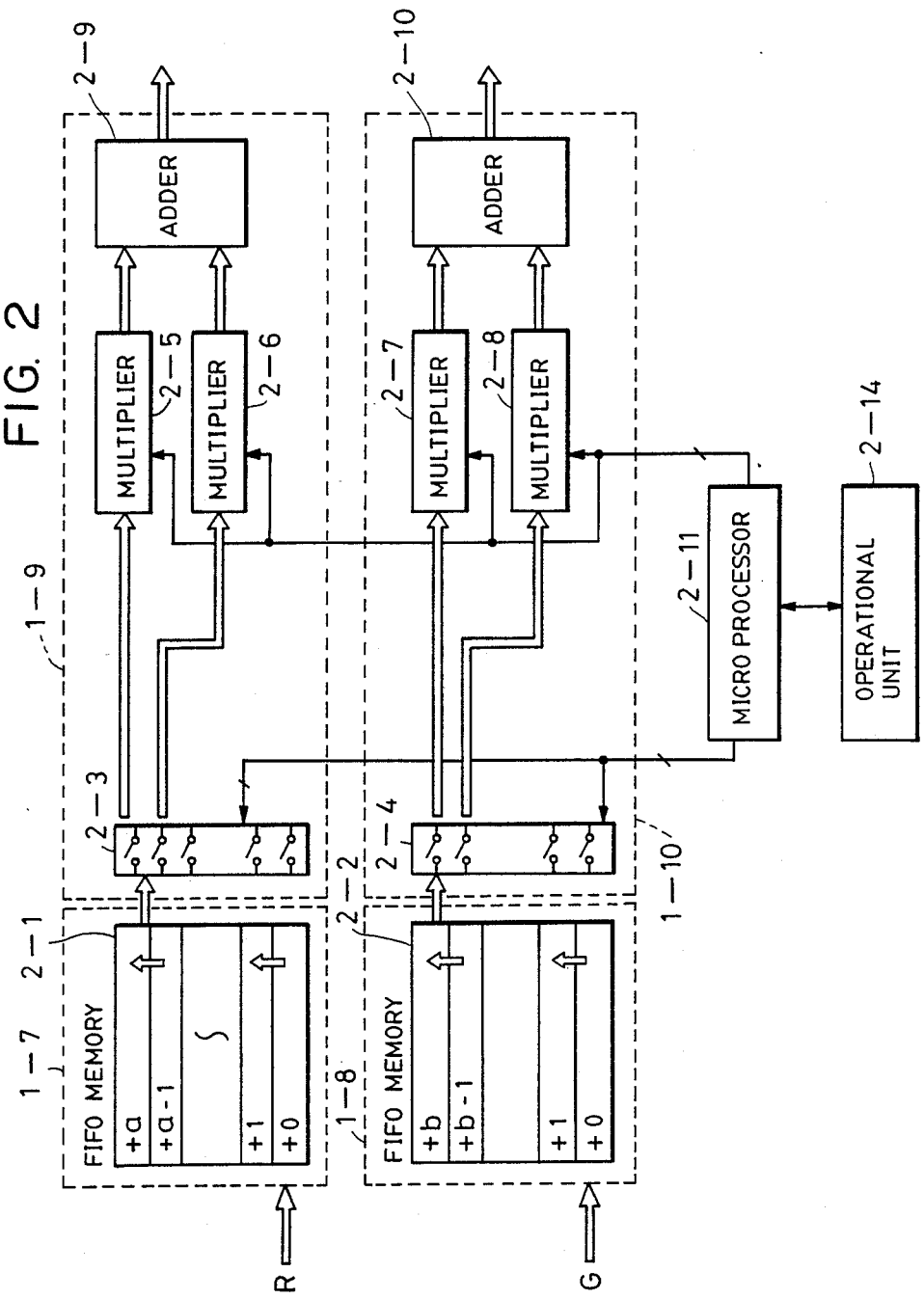
FIG. 2 is a block diagram illustrating a structure of delaying memories and interpolaters in the apparatus of FIG. 1.

FIG. 2 shows a detail of the delaying memories 1-7, 1-8 and the interpolaters 1-9, 1-10 in FIG. 1. The red signal delaying memory 1-7 and the green signal delaying memory 1-8 are illustrated as being FIFO (First In First-Out) memories 2-1, 2-2 in FIG. 2. The interpolaters 1-9 and 1-10 include selectors 2-3 and 2-4 for selecting parts of the FIFO memories 2-1 and 2-2 to be transferred to multipliers 2-5 through 2-8, which multiply the image data from the selected parts of the FIFO memory 2-1 and 2-2 by predetermined coefficients, and adders 2-9 and 2-10 which add the outputs of the multipliers. An operational unit 2-14 is provided for inputting a magnification, etc., and for displaying some informations. A microprocessor 2-11 controls at least the multipliers 2-5 through 2-8 and the selectors 2-3 and 2-4 in accordance with the magnification input from the operational unit 2-14.

Figure 3:
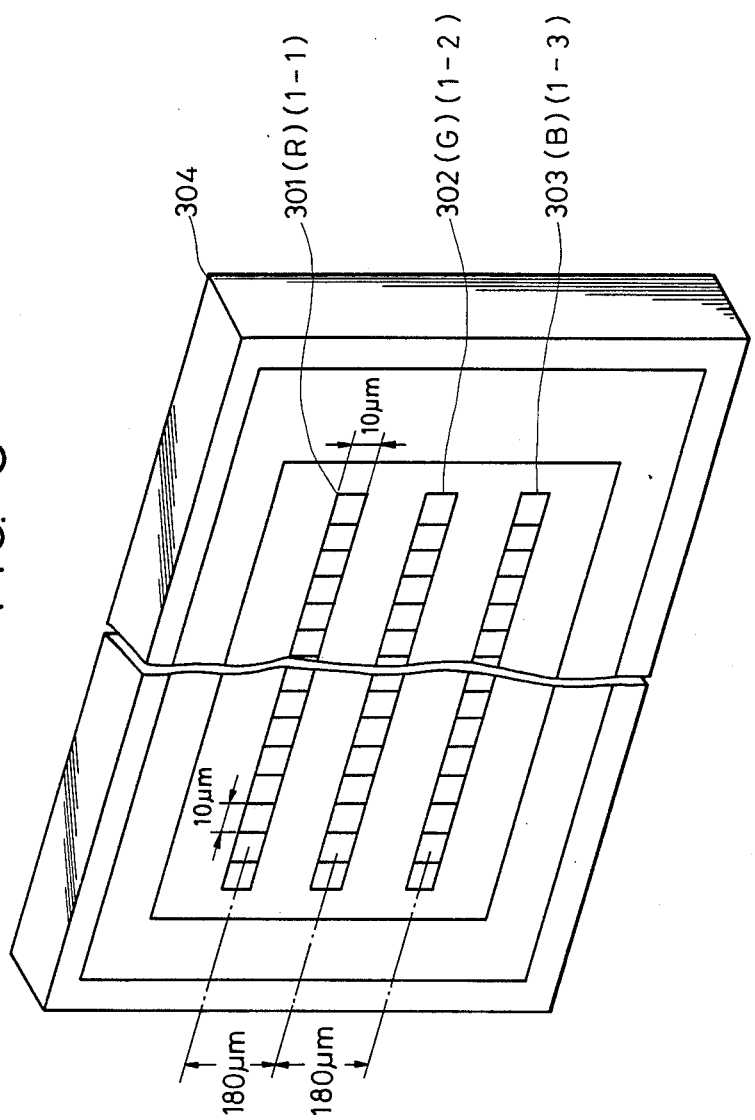
FIG. 3 is a schematic view of a color image sensor having three linear sensor arranged parallel to each other.

FIG. 3 shows a color sensor unit 304 of this first embodiment. The color sensor unit 304 includes a R linear sensor 301 (1-1), a G linear sensor 302 (1-2), and a B linear sensor 303 (1-3). The unit 304 is a semiconductor integrated circuit Thus all sensors with 301, 302 and 302 are arranged on the same circuit board.

In the first embodiment, the intervals between the R sensor 301 or the B sensor 303 and the G sensor 302 are 180 μm (micrometers). The vertical and horizontal widths of an image element to be imaged to which structure the sensors in 10 μm when equal size mode or 1 to 1 is selected. Thereby, during the equal size mode, the R delaying memory 1-7 has to have the capacity for storing image data of 36 lines, and the G delaying memory 1-8 has to have the capacity for storing that of 18 lines.

In this embodiment, in order to magnify 100% to 400% in a sub-scanning direction, which is the direction perpendicular to that of arrangement of the sensor elements, the R FIFO memory 2 1 has a capacity of 144 lines of image data and the G FIFO memory 2-2 has a capacity of 72 lines of image data.

Figure 4:
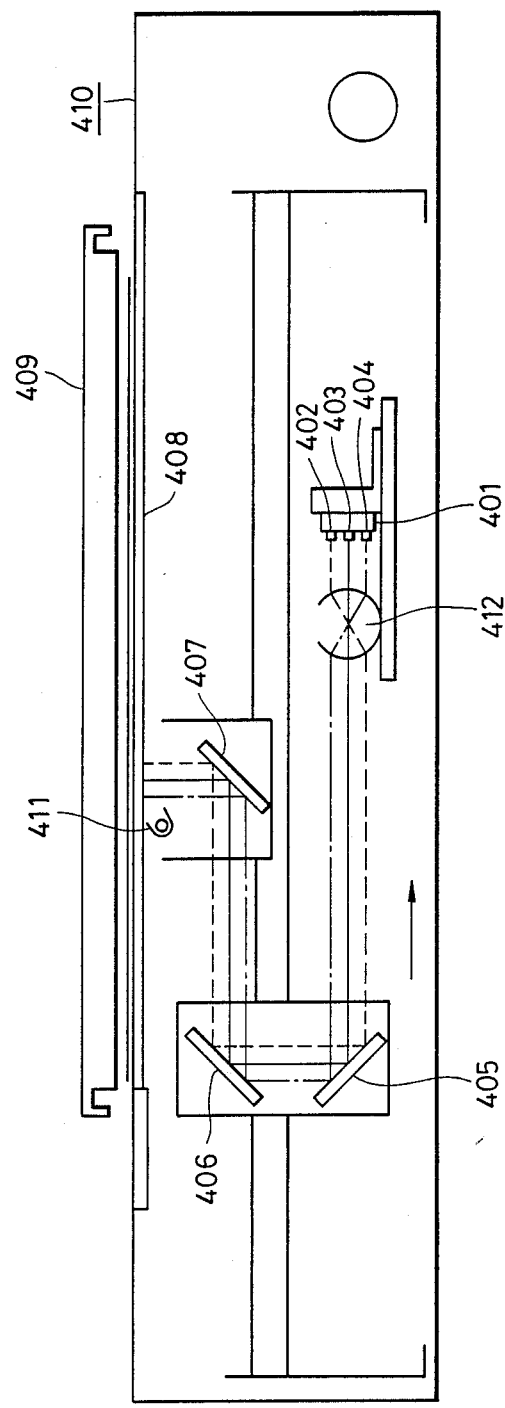
FIG. 4 is a cross-sectional view of the color image reading apparatus.

FIG. 4 shows a structure of the color image reading apparatus 410. The apparatus 410 includes the color sensor unit 401 (304) which has the R linear sensor 402 (301), the G linear sensor 403 (302) and B linear sensor 404 (303), a first reflective mirror 407, a second reflective mirror 406, a third reflective mirror 405, a platen 408 for placing originals on, an original cover 409 for pressing originals against the platen 408, and imaging lenses 412 for imaging original images on to the three linear sensors 402 through 404. The originals are sub-scanned in the direction designated by an arrow in FIG. 4. Thereby, the R sensor 402 reads a given horizontal scan line of the original before the other two sensors do so, by several lines, and the G sensor 403 does so previous to the B sensor 404, by several lines.

The explanation of operation of the first embodiment is described with reference to the flowchart of FIG. 5, as follows.

In a step 500, there are set the magnification N and a number m which is obtained by dividing the distance between the R sensor and the B sensor by the pitch of the image elements in the sub-scanning direction (in the equal size mode) or by the width of the sensor element in the sub-scanning direction. N might be designated by an operator via the operational unit 2- 14, or the apparatus might determine N in accordance with original size and a sheet size to be copied.

In this embodiment m equals 36, as follows:

$$m = (180 \mu m + 180 \mu m)/10 \mu m = 36$$

Now, if the magnification is assigned to be N=1.05, the actual number of image elements between the R sensor 401 and the B sensor 404 in the sub scanning direction should be $N \times m = 1.05 \times 36 = 37.8$ (image elements). Thereby, a line which the B linear sensor 404 is reading out at a given time coincides with a line which the R linear sensor 402 read 37.8 lines before. However, actually, the R linear sensor can read out only integer lines. Therefore, image data for the fictitious line from 37.8 lines before, is obtained by formula (1), which is well known as a linear interpolation, shown below:

$$D(37.8) = 0.2 \times D(37) + 0.8 \times D(38) \quad (1)$$

where D (#) is the image data of line #.

This interpolation calculation is carried out by the microprocessor 2-11.

In a step 501, the following formula (2) is calculated:

$$A = N \times m - [N \times m] \quad (2)$$

where the symbol []denotes the Gaussian integer function, the value of which is obtained by omitting the digits following the decimal point in the number within the brackets In this case, m=36, N=1.05 are applied to the formula (2):

$$A = 36 \times 1.05 - [36 \times 1.05] = 0.8 \quad (3)$$

In a step 502, the value A is set to the multiplier 2-5 as a coefficient for multiplying.

In a step 503, the value of [N×m]is calculated, and that value is used for selection by the selector 2-3. The value of [N×m]is an integer part of the distance or interval between the R linear sensor and the B linear sensor in the sub scanning direction. In the case where m=36 and N=1.05, then [N×m]equals 37. Thus the microprocessor 2-11 sets the selector 2-3 such that the image data D (37), advancing 37 lines in the R FIFO memory 2-1, should be input-to the multiplier 2-6 and such that the image data D (37+1), advancing 38 lines in the R FIFO memory 2-1, should be input to the multiplier 2-5.

In a step 504, the value of (1-A) is calculated and that value is set as a coefficient in the multiplier 2 6. Thus formula (1) is carried out, and the R image data of the same line as the B linear sensor is currently reading out is obtained.

In order to obtain G image data, the following processes are carried out, similarly as with the R image data.

First, formula (4), as follows, is calculated:

$$E = N \times l - [N \times l] \qquad (4)$$

The number l is obtained by dividing the distance between the G sensor and the B sensor by the pitch of the image elements in the sub scanning direction (in the equal size mode) or by the width of the sensor element in the sub scanning direction.

In the present embodiment l equals 18 as followings:

$$= 180 \, \mu m / 10 \mu m = 18$$

Now, since it is assumed that the magnification $N = 1.05$ in the sub scanning direction, the actual number of image elements between the G sensor 403 and the blue sensor 404 in the sub scanning direction should be $N \times l = 1.05 \times 18 = 18.9$ (image elements). As a result, a line which the B linear sensor 404 is reading out at a given time coincides with a line which the G linear sensor 403 has read 18.9 lines before. Thus, image data D (18.9) of the line 18.9 lines before is obtained by formula (5), which is well known as a linear interpolation:

$$D(18.9) = 0.1 \times D(18) + 0.9 \times D(19) \qquad (5)$$

The sharing rate E of this interpolation calculation is obtained from the following equation (6):

$$E = 18 \times 1.05 - [18 \times 1.05] = 0.9 \qquad (6)$$

In a step 506, the value of $[N \times l]$ is calculated, and in accordance with that value the microprocessor 2-11 sets the selector 2-4. The value of $[N \times l]$ is the integer part of the distance or interval between the G linear sensor and the B linear sensor in the sub-scanning direction. Since $N = 1.05$ and $l = 18$, $[N \times l] = 18$.

Thereby, the microprocessor 2-11 sets the selector 2-4 such that the image data D (18) advancing 18 lines in the G FIFO memory 2-2 is input to the multiplier 2-8 and such that the image data D (18+1) advancing 19 lines in the G FIFO memory 2-2 is applied to the multiplier 2-7.

In a step 507, the value of E (=0.9) is set to the multiplier 2-7 as a coefficient for multiplying.

In a step 508, a value of 1-E (=0.1) is calculated and set to the multiplier 2-8 as a coefficient for multiplying. Thus formula (4) is carried out, and the G image data of the same line as the B linear sensor is currently reading out is obtained by the interpolation as described above.

In this example, the numbers m and l are integers, but it is difficult to produce linear sensors having precisely the same intervals as designed. Assuming that the width of an image element on be imaged to a sensor element in the sub scanning direction is 10 μm when the equal size mode is selected, that the distance between the R sensor and the B sensor is 365 μm (m = 36.5), and that the distance between the G sensor and the B sensor is 178 μm (l = 17.8), interpolation processing is necessary not only in a reducing or enlarging mode but also in the equal size mode (N = 1).

For example, in the equal size mode the equations (1) and (4) are used the same as in the magnifying mode, as follows:

$$A' = 1 \times 36.5 - [1 \times 36.5] = 0.5$$
$$D(36.5) = 0.5 \times D(36) + 0.5 \times D(37)$$
$$E' = 1 \times 17.8 - [1 \times 17.8] = 0.8$$
$$D(17.8) = 0.2 \times D(17) + 0.8 \times D(18)$$

Figure 5:
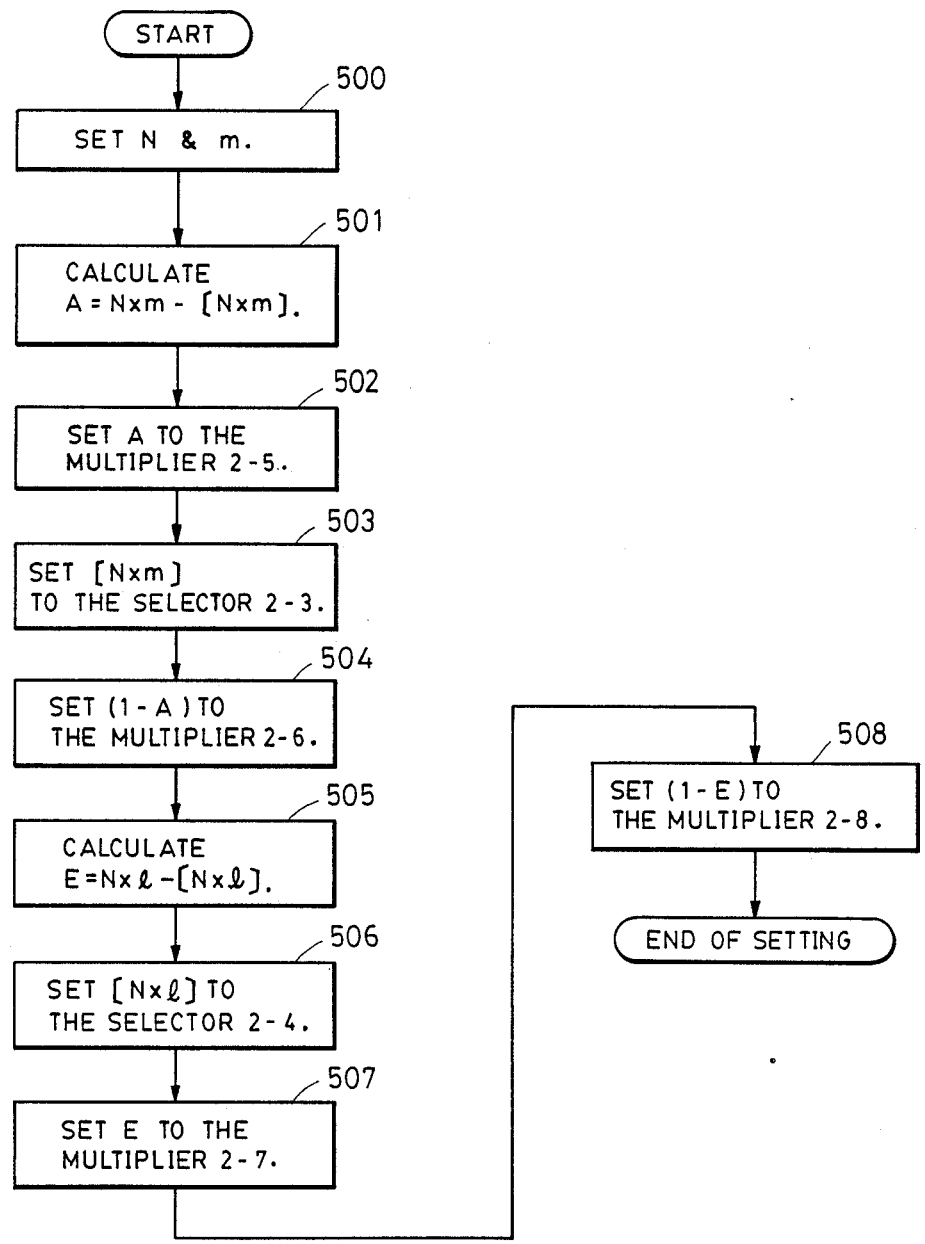
FIG. 5 is a flowchart illustrating processes carried out by a microprocessor.

In other words, the flow chart in FIG. 5 can be applied to various cases.

An explanation of a second preferred embodiment is as follows.

As mentioned above, if the number of image elements between parallel linear sensors in the equal size mode is t, the number of image elements in the magnification mode, when the magnification equals N, should be $N \times t$.

If $N \times t$ equals an integer, i.e., if the number of elements between the linear sensors is an integer times the distance between adjacent image elements in the sub-scanning direction, the interpolation calculation which is carried out by the interpolaters 1 9 and 1-10 would not be necessary. Hence, when $N \times t$ is not an integer the interpolation calculation should be performed, but when $N \times t$ is an integer the interpolation should be prohibited. Thus, when $N \times t$ is an integer, an operational error from the digital calculation should be reduced.

Figure 6:
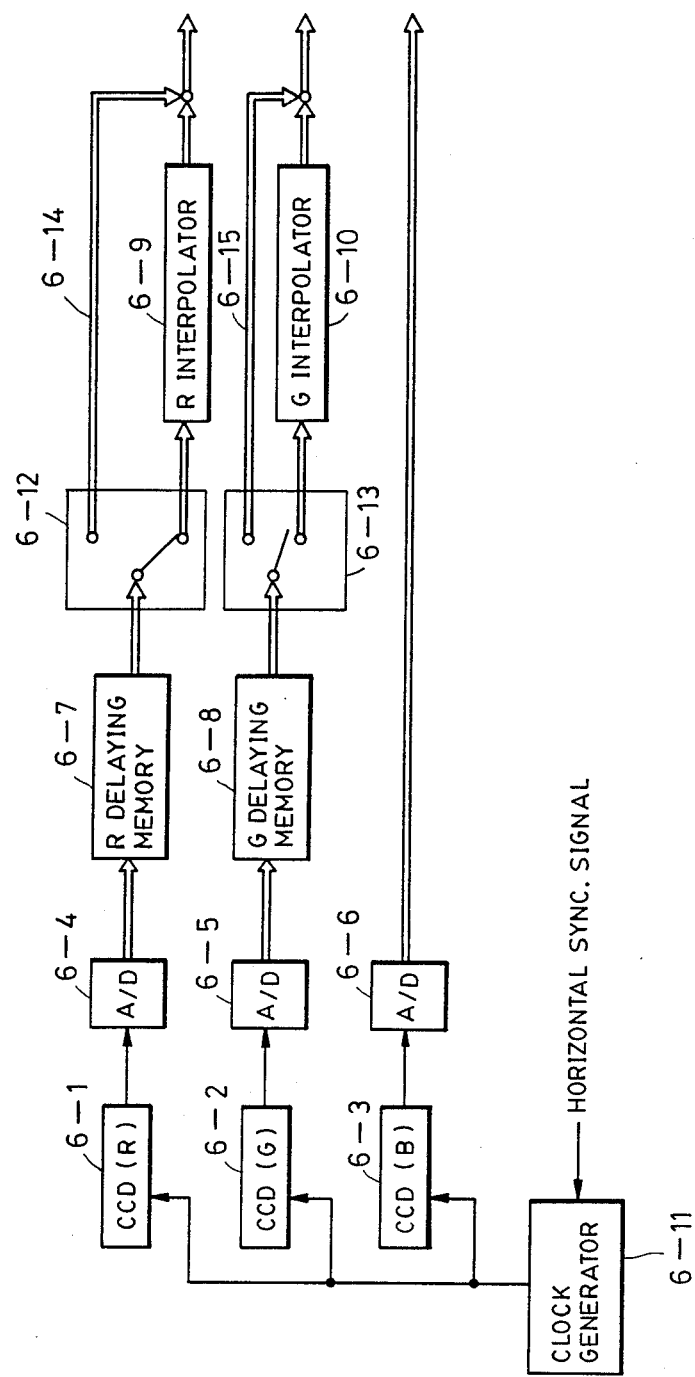
FIG. 6 is a block diagram of a color image reading apparatus according to a second embodiment of the invention.

FIG. 6 shows a block diagram of the second embodiment.

Similarly to the first embodiment, the color reading apparatus of the second embodiment includes an R linear sensor 6-1, a G linear sensor 6-2, and a B linear sensor 6-3. These sensors 6-1 through 6-3 are driven by means of a common image element clock which is generated in synchronism with a horizontal signal by a clock generator 6-11. Analog-digital converters 6-4, 6-5 and 6-6 are also provided for respectively converting the analog color signals output by the sensors 6-1, 6-2 and 6-3 to digital color signals. The apparatus also has an R delaying memory 6-7, a G delaying memory 6-8 and interpolaters 6-9 and 6-10. The above-mentioned structure is the same as the first embodiment.

The difference between these two embodiments, is that the second embodiment has selectors 6-12 and 6-13 for selecting signals or for by passing the interpolaters when $N \times t$ is an integer. Namely, when $N \times t_l$ ($t_l$ is the number of image elements between the R sensor 6-1 and the B sensor 6-3 in the equal size mode) is an integer, the selector 6-12 is set such that outputs of the memory 6-7 flow through a bus 6-14. If, on the other hand, $N \times t_l$ has a fractional part, the selecter 6-12 is set such that the outputs from the memory 6-7 flow through the interpolater 6-9.

Similarly, the selector 6-13 is set such that outputs of the memory 6-8 flow through a bus 6-15 when $N \times t_2$ ($t_2$ is the number of image elements between the G sensor 6-2 and the B sensor 6-3 in the equal size mode) is an integer, while when $N \times t_2$ is not an integer, the selecter 6-13 selects the interpolater 6-10.

If values of magnification N are limited such that a number that $N \times t$ must be an integer, magnification (which cannot vary continuously in value) can be carried out by means of the delaying memories without interpolations.

In these first and second embodiments, the R image data and the G image data are interpolated setting as a standard the image sensor B. But, the image sensor R or G might be set as a standard. For example, if the image sensor G or R is set as a standard, two lines of memory should be provided for storing the B image data in order to interpolate the B image data, and the interpolater for image data for G or R should be omitted. Further, in these embodiments, while interpolaters are provided, the linear sensors read the original image minutely, so that image data of a line which is very close to the same actual line as is being read by another sensor, might be selected and used without interpolation. Also, calculations of interpolation are carried out by hard logic circuits in these embodiments, but these calculations can instead be carried out by the microprocessor with a software program.

An explanation of a third embodiment is as follows:

The two embodiments described above have three linear color sensors, but the present invention can be applied to a reading apparatus which has two linear sensors for reading two color images, for example, a monochromatic image and a red image.

Figure 7:
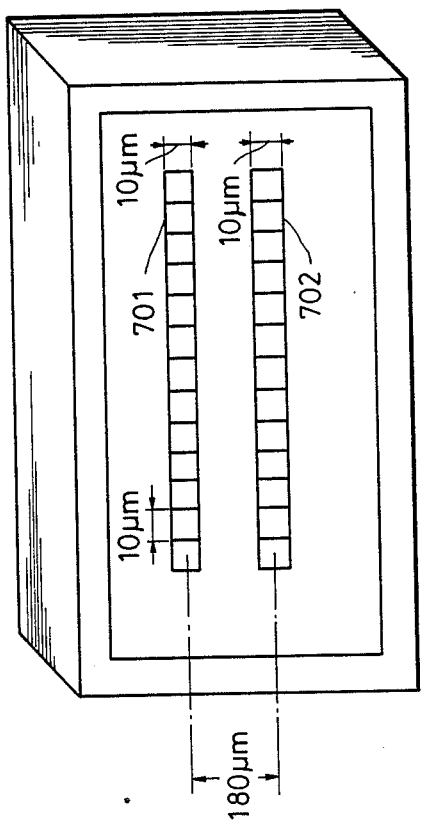
FIG. 7 is a schematic view of two linear sensors used in a two-color image reading apparatus according to a third embodiment of the invention.

FIG. 7 shows the structure of such a device, the two linear sensors including a red linear sensor 701 which is sensitive only to the red component, and a monochromatic linear sensor 702 sensitive to all wavelengths of visible light.

Figure 8:
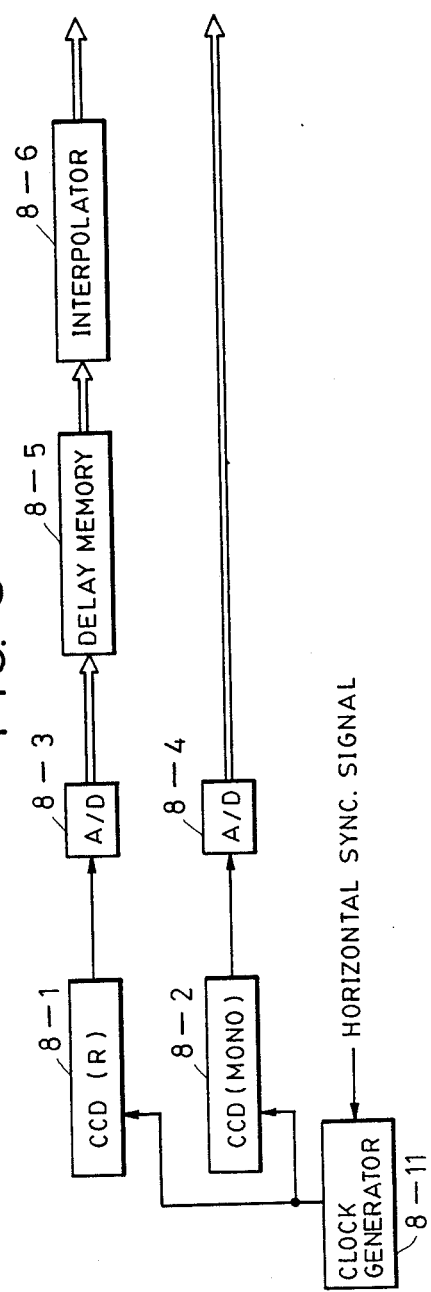
FIG. 8 is a block diagram cf the two color image reading apparatus according to the third embodiment of the invention.

FIG. 8 shows a block diagram of the third embodiment.

The reading apparatus includes the red linear sensor 8-1, the monochromatic sensor 8-2, analog-digital convertors 2-3 and 3-4, a delay memory 8-5, an interpolater 8-6 and a clock generator 8 11. The clock generator 8-11 drives both the red sensor 8 1 and the monochromatic sensor 8-2 with a common clock signal in synchronism with a horizontal synchronizing signal. The interpolater 8-6 operates the same as in the first and second embodiments.

The red image data of a line which has already been read by the monochromatic linear sensor to obtain monochromatic data can be obtained without a plurality of transfer clock signals.

Further, when the magnification mode is selected, even in the equal size mode, or when the distance between sensors is not an integral number of times the pitch of the image elements, the interpolation is carried out to obtain a plurality of color data of the same line.

Of course, if the distance between sensors is an integral number of times the pitch of the image elements, or in the equal magnification mode, a plurality of the sensors provide color data for the same line with a common driving clock signal, without interpolation.

A fourth preferred embodiment is explained as follows.

The above described three embodiments have color sensors, arranged parallel to each other, for reading the same area and for obtaining a plurality of color information, but the present invention can be applied also to a reading apparatus having plural color or monochromatic sensors which read respective different areas.

Figure 9:
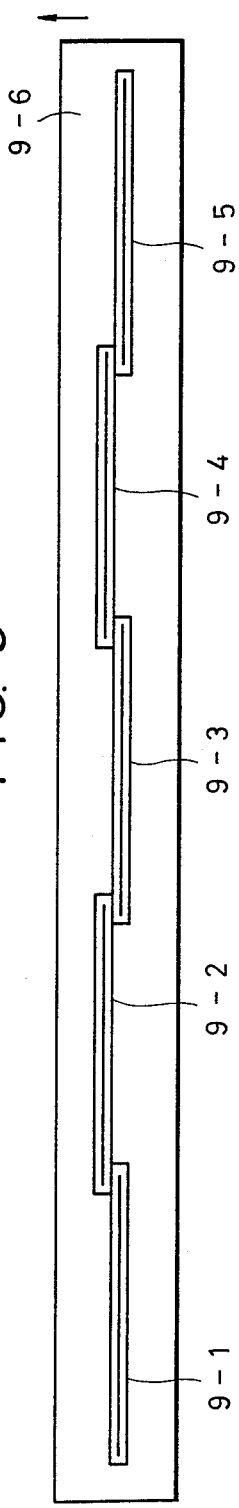
FIG. 9 is a schematic view of a reading unit of a fourth embodiment.
Figure 10:
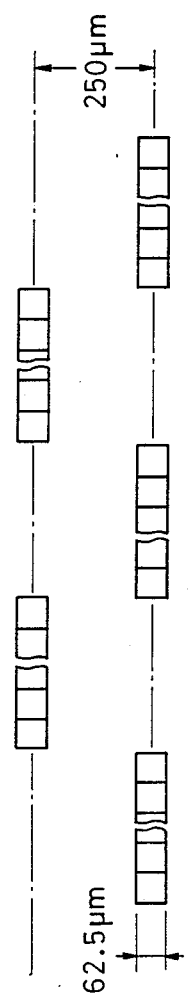
FIG. 10 is an enlarged view of FIG. 9.

This kind of reading apparatus, shown in FIG. 9, is suitable for reading a large original document with high resolution. When adjacent image sensors are driven with different timing signals, noise signals are added on the image signals as a result of crosstalk between the linear sensors. The reading unit shown in FIG. 9 includes five linear image sensors 9-1 through 9-5, arranged in a staggered manner on a single circuit board 9-6 and overlapping slightly along the main scanning direction. FIG. 10 shows an enlarged view of FIG. 9. As shown in FIG. 10, in this embodiment the distance between adjacent linear image sensors in the subscanning direction is 250 μm. Accordingly, adjacent linear image sensors simultaneously read different lines 250μm apart on the original.

Further, it is necessary to combine the image signals output from the five image sensors 9-1 through 9-5 to obtain an image signal representing one scanning line.

Since adjacent linear sensors simultaneously read different lines on the original, the image signals output from those linear image sensors which read in advance of the others, should be delayed to match with the image signals output from the latter image sensors. The amount of the delay should be changed in accordance with the magnification.

In this embodiment, to remove the noise signal due to crosstalk and to read the original with substantially any value of modification within same predetermined range, all of the linear image sensors are driven with the same timing signal, and interpolation processes are carried out in accordance with the magnification.

Figure 11:
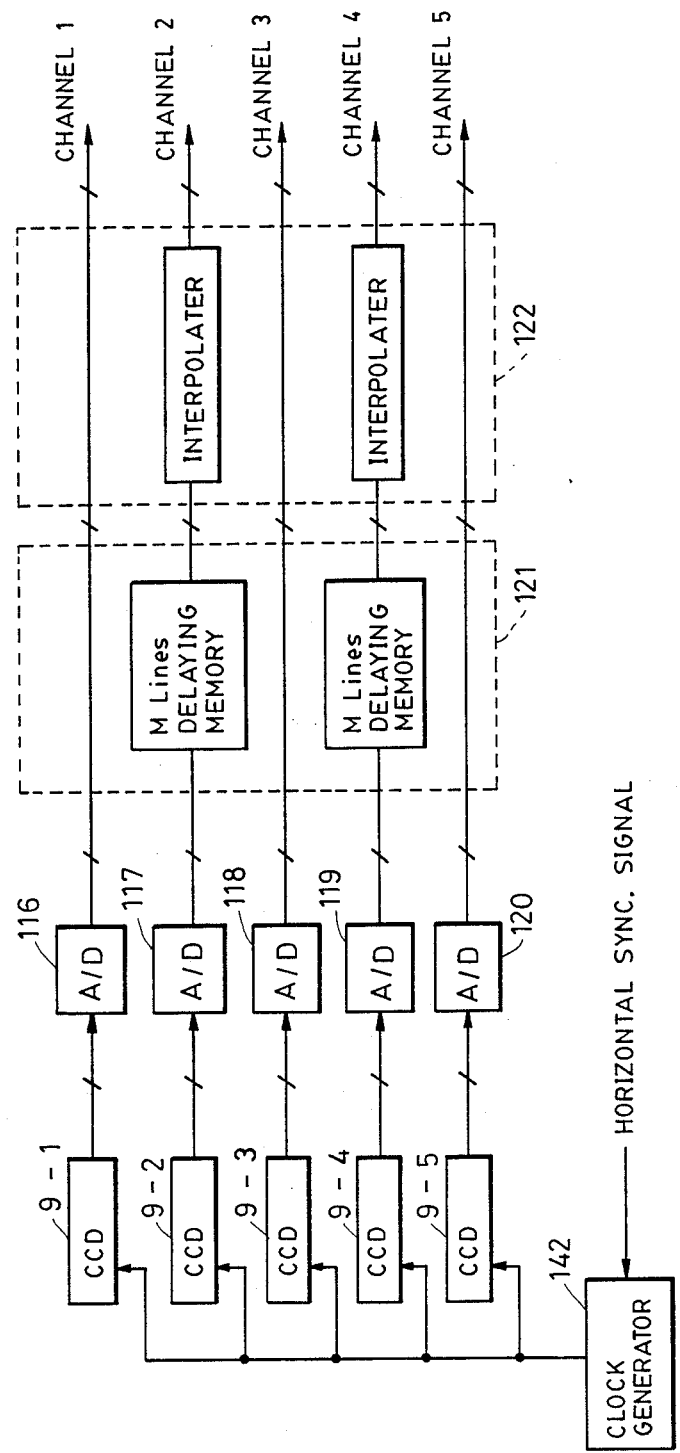
FIG. 11 is a block diagram of a reading apparatus according to the fourth embodiment.

FIG. 11 shows a block diagram of circuitry for processing the image signals output from the image sensors 9-1 through 9-5. CCD image sensors 9-1 through 9-5 are driven with the same image element transfer clock signal, from a clock generator 142. The clock generator 142 generates the transfer signal in synchronism with a horizontal synchronizing signal. Analog to digital converters 116 through 120 are provided for converting analog signals from the respective channels to digital signals.

Delaying memories 121 are provided for storing image signals to compensate for the distance between sensors in integral multiples of a basic unit distance. The delaying memories 121 are provided for the even channels 2 and 4 which read the original in advance of the other, odd channels 1, 3 and 5. The capacity of these delaying memories is determined by the magnification range and the distance between the sensors of the odd channels and those of the even channels.

Interpolators 122 are also provided for even channels 2 and 4 for causing the final reading output (at the right hand side of FIG. 11) of those two channels to be for the same lines as are the outputs of the odd sensors 9-1, 9-3 and 9-5. More specifically, the line in the memory 121 which has been read by the even sensors 9-2 and 9-4 is made to coincide with the line the information for which is being output by the odd channels. As described in connection with the other embodiments above, coefficients of interpolation are determined by the magnification and the distance between the even channels and the odd channels. This arrangement enables the image signals for a given line to be obtained without crosstalk.

Therefore, an image signal without noise signal can be obtained, and at the same time it is easy to magnify original images.

It should be noted that if there is an offset distance between the even sensors and the odd sensors, as in this embodiment, each channel needs a delaying memory and a interpolater except a "standard" (which here merely means predetermined) sensor and any sensor exactly aligned with the standard sensor.

Further, sensors 9-1 through 9-5 might be monochromatic sensors or color sensors provided with red, green and blue filters in alternation, one filter for every image element.

As described above, the present invention is able to provide an image processing apparatus which can obtain image signals for a given line using a plurality of linear image sensors arranged in parallel, without generating crosstalk between image sensors.

Although the preferred embodiments of the present invention are herein described in detail for purposes of explanation, various modifications thereof, after study of this specification, will be apparent to those skilled in the art to which the invention pertains.

I claim:

1. An image processing apparatus, comprising:
   a plurality of linear image sensors for reading an original image, which are arranged parallel to each other to read portions of the original image at least one of which portions is at a predetermined distance from others of the portions;
   setting means for setting a magnification to obtain a magnified image;
   first compensating means for processing an image signal obtained from at least one of said image sensors so as to compensate for an integer part of the distance between the portions in accordance with the magnification; and second compensating means for processing the image signal obtained from at least one of said image sensors so as to compensate for a decimal part of the distance between the portions in accordance with the magnification.

2. An image processing apparatus according to claim 1, wherein said second compensating means includes an interpolater for interpolating between image signals of two adjacent lines of the image.

3. An image processing apparatus according to claim 2, wherein said interpolater interpolates in accordance with the magnification.

4. An image processing apparatus according to claim 1, wherein said first compensating means includes a memory for delaying the image signal from at least one of said image sensors in accordance with the magnification.

5. An image processing apparatus according to claim 1, wherein said plurality of linear image sensors sense different respective color components.

6. An image processing apparatus according to claim 5, wherein said plurality of linear image sensors read at least a red component, a green component and a blue component of the original image.

7. An image processing apparatus according to claim 5, wherein said plurality of linear image sensors read at least a red component and a component comprising all wavelengths of visible light of the original image.

8. An image processing apparatus according to claim 1, wherein said plurality of sensors read different areas of the original image from each other.

9. An image processing apparatus according to claim 8, wherein said plurality of sensors are arranged in a staggered manner.

10. An image processing apparatus according to claim 1, further comprising a driver for driving said plurality of linear image sensors with substantially the same timing.

11. An image processing apparatus, comprising:
    a plurality of linear image sensors for reading an original image, which are arranged parallel to each other to read portions of the original image at least one of which portions is at a predetermined distance from others of the portions;
    setting means for setting a magnification to obtain a magnified image; and
    an interpolator for interpolating image signals of two adjacent lines of the image from one of said image sensors in accordance with the magnification to obtain an image signal on the same line as an image signal from another of said image sensors.

12. An image processing apparatus according to claim 11, wherein said interpolater interpolates in accordance with the predetermined distance.

13. An image processing apparatus according to claim 11, further comprising a memory for storing the image signals of two adjacent lines from said one of said image sensors.

14. An image processing apparatus according to claim 11, wherein said plurality of linear image sensors sense different respective color components.

15. An image processing apparatus according to claim 14, wherein said plurality of linear image sensors read out at least a red component, a green component and a blue component, of the original image.

16. An image processing apparatus according to claim 14, wherein said plurality of linear image sensors read at least a red component and a component of all wavelengths of visible light of the original image.

17. An image processing apparatus according to claim 11, wherein said plurality of sensors read different areas of the original image from each other.

18. An image processing apparatus according to claim 17, wherein said sensors are arranged in a staggered manner.

19. An image processing apparatus according to claim 11, further comprising a driver for driving said plurality of linear image sensors with substantially the same timing.

20. An image processing apparatus according to claim 19, wherein said driver drives said sensors with a common driving signal.

* * * * *

UNITED STATES PATENT AND TRADEMARK OFFICE
CERTIFICATE OF CORRECTION

PATENT NO. : 4,953,014
DATED : August 28, 1990
INVENTOR(S) : YOICHI TAKARAGI

It is certified that error appears in the above-identified patent and that said Letters Patent is hereby corrected as shown below:

COLUMN 2

Line 38, "sensor" should read --sensors--.
Line 50, "cf" should read --of--.

COLUMN 3

Line 35, "circuit" should read --circuit.--.
Line 36, "302" should read --303--.
Line 51, "memory 2 1" should read --2-1--.

COLUMN 4

Line 19, "sub scanning" should read --sub-scanning--.
Line 38, "symbol ▫" should read --symbol [ ]--.
Line 41, "brackets" should read --brackets.--.
Line 52, "sub scanning" should read --sub-scanning--.
Line 56, "input-to" should read --input to--.
Line 61, "multiplier 2 6." should read
    --multiplier 2-6.--, and "Thus" should read
    --Thus,--.

COLUMN 5

Line 5, "sub scanning" should read --sub-scanning--.
Line 7, "sub scanning" should read --sub-scanning--.
Line 10, "=180 $\mu$m/10$\mu$m=18" should read
    --l=180 $\mu$m/10$\mu$m=18--.
Line 30, "[NX1]ls" should read --[NX1] is--.
Line 52, "on be" should read --being--.
Line 53, "sub scanning" should read --sub-scanning--.

UNITED STATES PATENT AND TRADEMARK OFFICE
CERTIFICATE OF CORRECTION

PATENT NO. : 4,953,014

DATED : August 28, 1990

INVENTOR(S) : YOICHI TAKARAGI

It is certified that error appears in the above-identified patent and that said Letters Patent is hereby corrected as shown below:

COLUMN 6

Line 14, "interpolaters 1 9" should read
--interpolators 1-9--.

Line 38, "by passing" should read --by-passing--.

COLUMN 7

Line 23, "generator 8 11" should read --generator 8-11--.

Line 24, "sensor 8 1" should read --sensor 8-1--.

Line 45, "above described" should read
--above-described--.

COLUMN 8

Line 20, "Analog to digital" should read
--Analog-to-digital--.

UNITED STATES PATENT AND TRADEMARK OFFICE
CERTIFICATE OF CORRECTION

PATENT NO. : 4,953,014

DATED : August 28, 1990

INVENTOR(S) : YOICHI TAKARAGI

It is certified that error appears in the above-identified patent and that said Letters Patent is hereby corrected as shown below:

COLUMN 9

Line 17, "and second" should read --and ¶ second--.

Signed and Sealed this

Eleventh Day of August, 1992

Attest:

DOUGLAS B. COMER

Attesting Officer

Acting Commissioner of Patents and Trademarks